April 21, 1970     R. W. FERRIER     3,507,270

OCCLUDER FOR BLOOD VESSEL OR FLEXIBLE TUBE

Filed July 5, 1967

INVENTOR:
RAYMOND W. FERRIER
BY:
Cohn and Powell

United States Patent Office 3,507,270
Patented Apr. 21, 1970

3,507,270
OCCLUDER FOR BLOOD VESSEL OR
FLEXIBLE TUBE
Raymond W. Ferrier, 4547 Wichita Ave.,
St. Louis, Mo. 63110
Filed July 5, 1967, Ser. No. 651,296
Int. Cl. A61b 5/02, 17/12
U.S. Cl. 128—2.05                                9 Claims

ABSTRACT OF THE DISCLOSURE

An instrument for effectively controlling the constriction of a blood vessel or a flexible tube which includes an elongate stem having one end reciprocatively mounted in a connector tube and having a base carried by the other end of the stem. A flexible tape has its end passed through base slots and fixed to a connector flange, the tape forming a loop below the base. An actuating means is adjustably connected to the connector, and includes a member that extends into the connector tube and engages the stem, the actuating means selectively extending or retracting the stem relative to the connector so as to constrict or expand the tape loop respectively. A scale is provided between the actuating means and the connector so that any previously recorded loop diameter can be reproduced by a scale reading. Carried by the tape between the base and tape loop is a clip that selectively fixes the tape loop in a desired diameter. The occluder has a continuous canal opening through the base for communication inside the tape loop to permit the selective insertion of a catheter in the vessel under investigation.

BACKGROUND OF THE INVENTION

This invention relates generally to improvements in an occluder for a blood vessel or flexible tube, and more particularly a graduated vascular occluder with which it is possible to constrict a given blood vessel or flexible tube to any desired diameter, even to the point of complete occlusion, and restore it again to its full diameter, or to clamp the vessel in any desired constricted diameter.

In clinical surgery and in the research laboratory, the prior surgical clamps were difficult to apply and usually required constriction of the vessel in several distinct steps with intermediate stops of measuring in order to reach a desired diameter. There was no assurance that a given diameter could be reached in a single, constricting action of the clamp, and there was no mechanism by which any previously attained vessel diameter could be accurately reproduced. These heretofore conventional clamps did not incorporate any means by which a vessel could be quickly and easily fixed in a predetermined diameter.

SUMMARY OF THE INVENTION

This instrument can be used in the research laboratory for the study of flow characteristics through areas of stenosis by constricting the blood vessels or flexible tubes to any desired degree. The length of the stenosed segment can also be varied by using constricting tapes of different widths guided through compatible base slots.

In clinical surgery, the graduated vascular occluder can be used during those open-heat procedures where severe aortic regurgitation makes it necessary to cross-clamp the ascending aorta. With the occluder, the aorta can be constricted to a diameter when the regurgitant flow can be controlled satisfactorily with suction, while at the same time, the coronary circulation and the systemic perfusion are maintained adequately.

At the end of replacement or endarterectomy procedures of the abdominal aorta, the occluder can serve conveniently to regulate and adapt the return of the blood flow to the extremities according to the hemodynamic situation, by full control over the aortic diameter.

The occluder can be used to band the pulmonary artery at a desired diameter to relieve temporarily some of the adverse conditions caused by a congenital heart defect until a more propitious time for subsequent surgery to repair the defect itself.

The occluder includes a flexible tape having its ends passed through slots formed in a base carried at one end of a stem that is reciprocatively mounted in a connector tube, the tape being fixed to a connector flange and forming a loop below the base. An actuating means is adjustably connected to the connector and includes a member extending into the connector tube and engaging the stem. The actuating means selectively extends or retracts the stem relative to the connector so as to constrict or expand the tape loop respectively. A scale is provided between the actuating means and the connector so that any previously recorded loop diameter can be reproduced by a scale reading.

A clip is carried by the tape and is located between the base and the tape loop, the clip being adapted to fix the tape loop selectively in a desired diameter. More particularly, the tape loop is passed through a slot in the clip, and a fastener carried by the clip is selectively movable across the clip slot to pin the tape loop.

The actuating means includes a cap threadedly connected to the connector tube, and a vernier-type scale is provided between the cap and the connector tube, the scale being correlated to the pitch of the threads connecting the cap and the connector tube. The tape loop has a predetermined diameter at a predetermined scale reading so that the loop diameter can be determined from the scale during constriction and expansion.

Formed in the stem and actuating means is an elongate, continuous canal that opens through the base and communicates interiorly of the tape loop for the introduction of a cardiovascular catheter in the vessel located in the tape loop.

The occluder includes means on the connector for fixing the tape ends at predetermined points spaced longitudinally along the tape so that the tape loop has a predetermined diameter at a predetermined scale reading.

DETAILED DESCRIPTION OF THE PREFERRED EMBODIMENT

Figure 1:
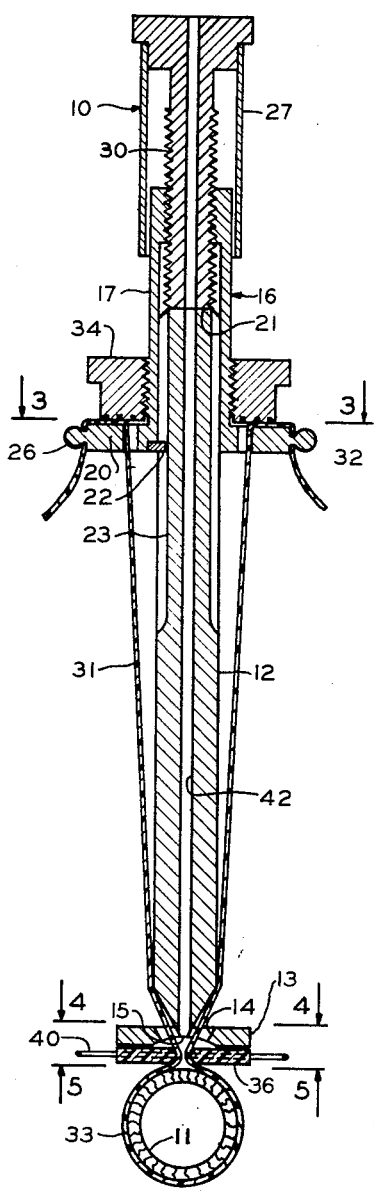
FIG. 1 is a cross sectional view of the occluder fitted to a vessel.
Figure 2:
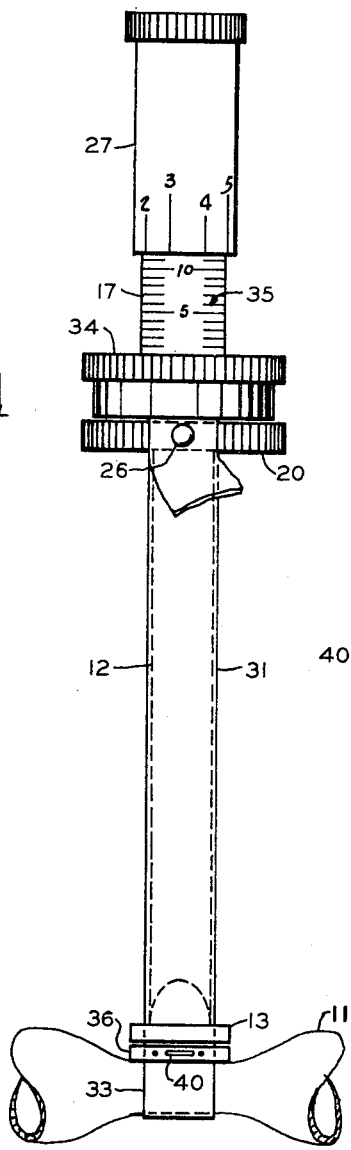
FIG. 2 is an elevational view of the occluder taken at a right angle to FIG. 1, the vessel being restricted.
Figure 3:
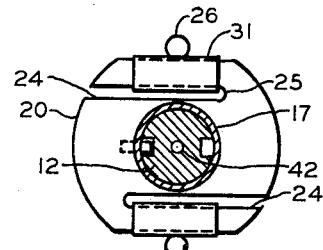
FIG. 3 is a cross section taken on line 3—3 of FIG. 1.
Figure 4:
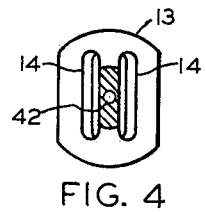
FIG. 4 is a cross section taken on line 4—4 of FI G.1.

Referring now by characters of reference to the drawing, and first to FIG. 1, it will be understood that the occluder generally referred to by 10 is applied to a blood vessel or a flexible tube indicated by 11. The tube may be made of rubber, plastic or the like. FIG. 1 shows the vessel 11 in its original diameter. FIG. 2 shows the vessel 11 constricted by the occluder 10.

The occluder 10 includes an elongate stem 12. Carried by one end of stem 12 is a base 13 extending laterally from opposite sides of stem 12. The base 13 is provided with a pair of spaced slots 14, one slot 14 on each side of stem 12. The stem end is tapered to provide a narrow edge 15 between the base slots 14, the purpose of which will be explained upon subsequent detailed description of parts.

A connector referred to by 16 reciprocatively mounts the stem 12. The connector 16 includes a tube 17 and an integral flange 20. The upper end 21 of stem 12 is received in connector tube 17. A key 22, secured to the connector 16 and extending into the conector tube 17, slidably interfits one of the pair of keyways 23 formed in opposite sides of stem 12. The coacting key 22 and keyways 23 enable relative reciprocative movement of the connector 16 and stem 12, yet preclude relative rotation.

The connector flange 20 is provided with a pair of slots 24, one slot 24 on each side of connector tube 17 and stem 12. Each of the flange slots 24 opens at the periphery of flange 20 and has a closed end 25. For reasons which will later appear, the flange slots 24 extend in relatively reversed directions.

Extending from each side of and formed integrally with the connector flange 20, is a tape-fixation knob 26. Each knob 26 is located adjacent one of the flange slots 24.

An actuating means for effectively and selectively extending or retracting the stem 12 relative to the connector tube 17, is carried by the connector 16. The actuating means includes a cap 27 embracing and receiving the connector tube 17. A feed screw 30 extends into and is threadedly connected to the connector tube 17, the feed screw engaging the stem end 21. Upon turning the cap 27 in one direction, the cap moves down over the connector tube 17 and the feed screw 30 pushes the stem 12 relatively out of the connector tube 17. Turning the cap 27 in the opposite direction enables the stem 12 to be relatively retracted in the connector tube 17.

A flexible tape 31 has its ends passed upwardly through the base slots 14, extended upwardly along opposite sides of stem 12, and then inserted into the flange slots 24. The tape 31 is provided with a pair of holes 32 spaced a predetermined distance apart longitudinally of tape 31, the tape holes 32 being located near the tape ends. After the tape ends are located in the flange slots 24, the tape ends are laid over the connector flange 20 and the knobs 26 are snapped into the tape holes 32. When the tape 31 is fixed at predetermined points to the connector flange 20, a tape loop 33 of a predetermined diameter is formed below the base 13 at a particular relative longitudinal disposition of cap 27 and connector tube 17.

Threadedly attached to the connector tube 17 is a tape-fixation collar 34, the collar 34 being selectively movable toward or away from the connector flange 20. The collar 34 overlies the flange slots 24 so that the tape ends can be clamped between the collar 34 and the connector flange 20. A serrated face on the collar 34 provides a more effective clamping action. The collar 34 is especially useful in fixing the tape 31 to the connector 16 when the tape 31 that is utilized does not have the tape holes 32. The closed ends 25 of the flange slots 24 are arranged so that the collar 34 moves generally from the open peripheral ends toward the closed ends 25 when the collar 34 is turned in a direction to clamp the tape ends. This arrangement precludes the possibility of unintentionally disconnecting the tape ends from the flange slots 24 as a result of the turning action of the collar 34.

Provided between the cap 27 and the connector tube 17 is a vernier-type scale indicated by 35 in FIG. 2. The scale 35 permits the reproduction by a scale reading of any previously recorded tape loop diameter. Preferably, the scale 35 is correlated to the pitch of the feed screw 30, and the tape loop 33 has a predetermined diameter at a predetermined scale reading so that the loop diameter can be readily determined from the scale 35 during constriction and expansion.

Figure 5:
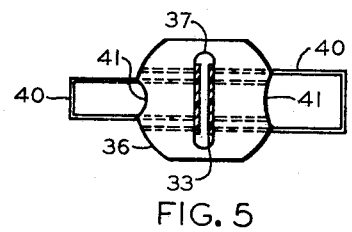
FIG. 5 is a cross section taken on line 5—5 of FIG. 1.

A clip 36, made of an inert plastic, is disposed immediately below the base 13. The clip 36 is provided with a narrow slot 37 (FIG. 5) through which the tape loop 33 is passed, the clip slot 37 being located in vertical alignment with the stem edge 15 so that the tape loop 33 is substantially closed to form a substantially circular cross sectional configuration. Carried by the clip 36 on opposite sides of clip slot 37, are a pair of substantially U-shaped fasteners 40, constituting pins. One of the U-shaped fasteners 40 is slightly wider than the other so that the fasteners are arranged one within the other.

In certain surgical procedures, as in the banding of the pulmonary artery, it is necessary to fix the tape loop 33 about the vessel 11 with a predetermined constriction. When the desired vessel diameter is attained, the U-shaped fasteners 40 are simply depressed so as to cross the clip slot 37 and pin the tape loop 33. During later surgery, the clip 36 is removed by pulling the U-shaped fasteners 40 to release the tape loop 33. Recesses 41, formed in the clip periphery inside the bights of the U-shaped fasteners 40, facilitate withdrawal of the fasteners 40.

Extending longitudinally along the feed screw 30 and stem 12 is an elongate, continuous canal 42 that opens at the stem edge 15 between the tape loop 33. A cardiovascular catheter (not shown) may be introduced into the vessel 11 through a puncture in the wall of the vessel 11. The puncture is made by inserting a special needle, provided with the occluder 10, in the central canal 42 and into the vessel wall. With the cardiovascular catheter, pressures and other hemodynamic parameters can be obtained. In addition, dye studies can be performed, if so desired.

It is thought that the functional advantages of the occluder have become apparent from the foregoing detailed description, but for completeness of disclosure, the usage will be briefly described. It will be assumed that the occluder is to be used to constrict a vessel 11 to a desired diameter.

The tape 31 is placed about the vessel 11, and the tape ends are fed upwardly through the base slots 14 and slipped into the flange slots 24. The collar 34 is threaded down on the connector flange 20 to clamp the tape ends therebetween. Upon turning the cap 27, the feed screw 30 extends the stem 12 and constricts the tape loop 33, and hence constricts the vessel 11. At any degree of constriction, a reading of scale 35 may be made. Any previously recorded loop diameter can be reproduced by the scale reading. Upon actuation of cap 27, the vessel 11 can be constricted to any desired diameter, even completely occluded, and expanded back to its original diameter.

The tape 31 can be provided with spaced holes 32 at predetermined locations so that the tape ends can be fixed at predetermined points to the connector flange 20. With this type of tape 31, the knobs 26 are snapped into the tape holes 32 after the tape ends are fitted into the flange slots 24. The collar 34 is threaded down on the tape ends to clamp the tape ends between the collar 34 and the connector flange 20. The length of tape 31 between the holes 32 is related to the dimensions of the occluder parts and to the scale so that a particular type loop diameter is attained at a specified scale reading. The pitch of feed screw 30 is related to the divisions of the scale 35 so that the tape loop diameter can be determined from the scale 35 as the vessel 11 is constricted or expanded upon manipulation of cap 27.

The tape 31 should in general consist of highly pliable material having great tensile strength and minimal stretch. Tapes of different widths can be used to regulate the length of the stenosed vessel segment. Of course, the word "tape" is inclusive to cover a cord or any other similar flexible element suitable to form a loop about the vessel 11.

If it is desired to band a vessel 11, as in the banding of the pulmonary artery, the tape ends are passed through the clip slot 37 before they are passed through the base slots 14. The clip 36 is thereby located between the tape loop 33 and base 36. When the vessel 11 has been constricted to the desired diameter, the clip 36 is pinned to the tape 31 to fix the tape loop and vessel diameter by pressing the U-shaped fasteners 40 inwardly so that the fasteners traverse the clip slot 37. The tape 31 can be severed adjacent the upper side of clip 36, and the occluder removed. The tape loop 33 and the clip 36 will be retained on vessel 11 until it is removed intentionally during subsequent surgical procedure.

During the use of the occluder in constricting or expanding the vessel 11, the canal can be effectively utilized by a catheter for investigative purposes.

I claim as my invention:

1. An occluder, comprising:
   (a) an elongate stem,
   (b) a base carried by one end of the stem, the base being provided with a pair of slots, one slot on each side of the stem,
   (c) a connector including a tube and a flange, the other end of the stem being reciprocatively mounted in the connector tube,
   (d) a flexible tape having its ends passed through the base slots and fixed to the connector flange, the tape forming a loop below the base,
   (e) an actuating means adjustably connected to the connector and including a member extending into the connector tube and engaging the stem, the actuating means selectively extending or retracting the stem relative to the connector so as to constrict or expand the tape loop selectively,
   (f) a clip carried by the tape and located between the base and tape loop, the clip selectively fixing the tape loop in a desired diameter.

2. An occluder, comprising:
   (a) an elongate stem,
   (b) a base carried by one end of the stem, the base being provided with a pair of slots, one slot on each side of the stem,
   (c) a connector including a tube and a flange, the other end of the stem being reciprocatively mounted in the connector tube,
   (d) a flexible tape having its ends passed through the base slots and fixed to the connector flange, the tape forming a loop below the base,
   (e) an actuating means adjustably connected to the connector and including a member extending into the connector tube and engaging the stem, the actuating means selectively extending or retracting the stem relative to the connector so as to constrict or expand the tape loop respectively,
   (f) a clip provided with a slot through which the tape loop is passed, the clip being located adjacent the base, and
   (g) a fastener carried by the clip and selectively moved across the clip slot to fix the tape loop in a desired diameter.

3. An occluder, comprising:
   (a) an elongate stem,
   (b) a base carried by one end of the stem, the base being provided with a pair of slots, one slot on each side of the stem,
   (c) a connector including a tube and a flange, the other end of the stem being reciprocatively mounted in the connector tube,
   (d) a flexible tape having its end passed through the base slots and fixed to the connector flange, the tape forming a loop below the base,
   (e) an actuating means adjustably connected to the connector and including a member extending into the connector tube and engaging the stem, the actuating means selectively extending or retracting the stem relative to the connector so as to constrict or expand the tape loop selectively,
   (f) the actuating means including a cap threadedly connected to the connector tube,
   (g) a vernier-type scale provided between the cap and the connector tube, the scale being correlated to the pitch of the threads connecting the cap and connector tube, and
   (h) the tape loop having a predetermined diameter at a predetermined scale reading so that the loop diameter can be determined from the scale during constriction and expansion.

4. An occluder, comprising:
   (a) an elongate stem,
   (b) a base carried by one end of the stem, the base being provided with a pair of slots, one slot on each side of the stem,
   (c) a connector including a tube and a flange, the other end of the stem benig reciprocatively mounted in the connector tube,
   (d) a flexible tape having its ends passed through the base slots and fixed to the connector flange, the tape forming a loop below the base,
   (e) an actuating means adjustably connected to the connector and including a member extending into the connector tube and engaging the stem, the actuating means selectively extending or retracting the stem relative to the connector so as to constrict or expand the tape loop respectively,
   (f) the stem and actuating means including an elongate, continuous canal opening through the base between the base slots for communication inside the tape loop for the introduction of a catheter into a vessel held in the tape loop.

5. An occluder, comprising:
   (a) an elongate stem,
   (b) a base carried by one end of the stem, the base being provided with a pair of slots, one slot on each side of the stem,
   (c) a connector including a tube and a flange, the other end of the stem being reciprocatively mounted in the connector tube,
   (d) a flexible tape having its end passed through the base slots and fixed to the connector flange, the tape forming a loop below the base,
   (e) an actuating means adjustably connected to the connector and including a member extending into the connector tube and engaging the stem, the actuating means selectively extending or retracting the stem relative to the connector so as to constrict or expand the tape loop selectively,
   (f) the connector flange being provided with a pair of slots, one on each side of the stem, the flange slots receiving the ends of the tape, each flange slot having one end opening to the periphery of the flange to enable entry of the tape and having one closed,
   (g) a tape-fixation collar threadedly connected to the connector tube and selectively movable toward or away from the connector flange, the collar selectively clamping the ends of the tape between the collar and connector flange, and
   (h) the closed ends of the flange slots being arranged so that the collar moves from the open ends to the closed ends when turned in a direction to clamp the tape ends.

6. An occluder, comprising:
   (a) an elongate stem,
   (b) a base carried by one end of the stem, the base being provided with a pair of slots, one slot on each side of the stem,
   (c) a connector including a tube and a flange, the other end of the stem being reciprocatively mounted in the connector tube,
   (d) a flexible tape having its end passed through the base slots and fixed to the connector flange, the tape forming a loop below the base,
   (e) an actuating means adjustably connected to the connector and including a member extending into the connector tube and engaging the stem, the actuating means selectively extending or retracting the stem relative to the connector so as to constrict or expand the tape loop respectively, (f) the connector flange being provided with a pair of slots on opposite sides of the stem, (g) a pair of knobs on the connector flange, one knob being located adjacent each flange slot, (h) the tape being provided with a pair of holes spaced longitudinally a predetermined distance, the tape having its ends passed through the flange slots and overlying the flange, and having the tape holes receiving the knobs to fix the tape ends, and (i) a tape-fixation collar threadedly connected to the connector tube and overlying the tape ends extending from the knobs to the flange slots, the collar selectively clamping the tape ends between the collar and the connector flange.

7. An occluder, comprising:
(a) an elongate stem,
(b) a base carried by one end of the stem, the base being provided with a pair of slots, one slot on each side of the stem,
(c) a connector including a tube and a flange, the other end of the stem being reciprocatively mounted in the connector tube,
(d) a flexible tape having its end passed through the base slots and fixed to the connector flange, the tape forming a loop below the base,
(e) an actuating means adjustably connected to the connector and including a member extending into the connector tube and engaging the stem, the actuating means selectively extending or retracting the stem relative to the connector so as to constrict or expand the tape loop respectively,
(f) means between the stem and connector enabling reciprocative movement of the stem, yet precluding relative rotation,
(g) the connector flange being provided with a pair of slots, one on each side of the stem, the flange slots receiving the ends of the tape,
(h) a tape-fixation collar threadedly connected to the connector tube and overlying the flange slots, the collar selectively clamping the tape ends between the collar and the connector flange,
(i) the actuating means including a cap receiving the connector tube, (j) the member engaging the stem being a feed screw threadedly connected to the connector tube, and (k) a vernier-type scale provided between the cap and connector tube so that any previously recorded loop diameter can be reproduced by a scale reading.

8. An occluder as defined in claim 7, in which:
(l) means is on the connector flange fixing the tape ends at predetermined points spaced longitudinally along the tape so that the tap loop has a predetermined diameter at a predetermined scale reading, and
(m) the scale is correlated to the pitch of the feed screw so that the loop diameter can be determined from the scale during constriction and expansion.

9. An occluder as defined in claim 7, in which:
(l) a clip includes a slot through which the tape loop is passed, the clip being located adjacent the base, and
(m) a pair of substantially U-shaped pins are carried by the clip, one pin being located on each side of the clip slot, and the pins being slectively movable across the clip slot and into the tape to fix the tape loop in a desired diameter.

References Cited
UNITED STATES PATENTS

| | | | |
|---|---|---|---|
| 780,919 | 1/1905 | Shockley | 33—179 |
| 855,875 | 6/1907 | Bode | 33—179 |
| 893,405 | 7/1908 | Weisbeck et al. | 81—3.43 |
| 1,036,927 | 8/1912 | Struble | 33—179 |
| 2,049,361 | 7/1936 | Ericsson | 128—92 |
| 2,375,507 | 5/1945 | Van Tuyl et al. | 24—243 |
| 2,526,055 | 10/1950 | Webb | 24—278 |
| 2,670,730 | 3/1954 | Kellogg | 128—2 |
| 3,043,308 | 7/1962 | Seltzer | 128—346 |

FOREIGN PATENTS 672,228  9/1929  France.

DALTON L. TRULUCK  Primary Examiner

U.S. Cl. X.R.

24—19, 135, 243; 33—179; 81—3.43; 128—327, 346